C. H. ROLOSON.
Tackle-Hook.
No. 214,318.  Patented April 15, 1879.
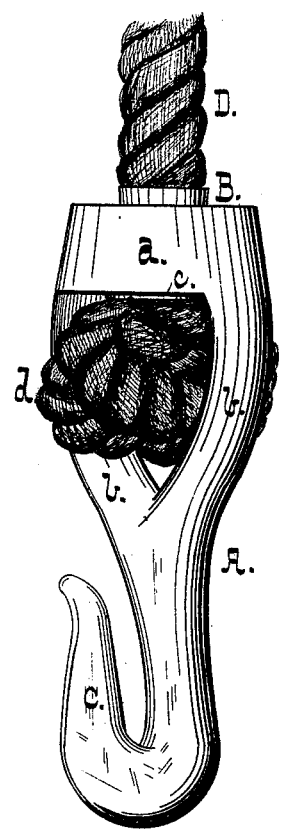

UNITED STATES PATENT OFFICE.

CHARLES H. ROLOSON, OF BALTIMORE, MARYLAND.

IMPROVEMENT IN TACKLE-HOOKS.

Specification forming part of Letters Patent No. 214,318, dated April 15, 1879; application filed February 18, 1879.

*To all whom it may concern:*

Be it known that I, CHARLES H. ROLOSON, of Baltimore city, State of Maryland, have invented certain new and useful Improvements in Tackle-Hooks; and I hereby declare the same to be fully, clearly, and exactly described as follows, reference being had to the accompanying drawing, in which the device is illustrated in side elevation.

My invention relates to that class of devices in use, especially on shipboard, for securing the ends of ropes to various objects; and it consists in a tackle-hook constructed as hereinafter described, and adapted for use as set forth.

Hooks of the class named, whether single or sister hooks, have heretofore generally been furnished with a ring concave on its periphery for the reception of the rope, which latter was brought around the ring, and its end was spliced into the main part or laid up against it and moused with marline. Either method involves the expenditure of a considerable amount of line and time, besides resulting in a job which is, at best, unsightly.

In the accompanying drawing is illustrated a hook designed to secure important results in point of economy of rope, symmetry, and security of fastening, and saving of time required to bend the rope to the hook.

The hook A is preferably made of wrought-iron, and has a recurved end, C, of the usual shape and relative size. A collar, $a$, is formed on the upper ends of the arms $b$, and is centrally perforated for the passage of the line D. The space inclosed by the arms $b$ and collar $a$ is sufficiently large as compared with the hole in the collar to accommodate a turk's-head or knot, $d$, seized in the end of a rope which fits therein.

B is a thimble, made preferably of sheet metal, having a flange, $c$, which rests against the under side of the collar and admits of the rope swiveling therein. The thimble prevents any abrasion of the rope from contact with the edge of the hole in the collar, which latter is considerably smaller than the internal diameter between the arms $b\ b$, thereby forming a flat bearing all around for the knot. As the rope fits snugly through the hole, it is impossible to pull it therethrough as long as the knot remains, and the latter, being jammed by the constant strain, is prevented from coming loose.

While I have illustrated but a single hook in the drawing, my invention is obviously equally applicable to sister hooks, the second hook being pivoted to the shank, or being furnished with a T-shaped head and passed through the eye below the knot.

The device, as a whole, furnishes a neat, strong, and reliable fast, and is applicable for use wherever it is desired to make the end of a line fast to an eyebolt or ring, as on the braces, lifts, sheets, and halyards of a vessel, or on hoisting devices on shipboard or ashore.

I am aware that wire-ropes have been secured in conical thimbles by means of wedges driven axially into the ropes, and such I do not claim. Such a device, it is believed, would not be practical to retain a hempen rope, and a wire-rope does not admit of a knot being formed in it for attachment in the manner hereinbefore described.

What I claim is—

1. In combination with the line D, having a turk's-head or knot seized in its end, the hook A, having arms $b\ b$, inclosing an enlarged space for the knot, and collar $a$, the latter being adapted to form a transverse bearing for the knot, as and for the purpose set forth.

2. In combination with the hook A, having arms $b$ and collar $a$, the flanged thimble B and knotted line D, substantially as set forth.

CHAS. H. ROLOSON.

Witnesses:
R. D. WILLIAMS,
J. C. GITTINGER.